United States Patent
Yamazaki et al.

(10) Patent No.: US 9,596,454 B2
(45) Date of Patent: Mar. 14, 2017

(54) IMAGING APPARATUS AND IMAGING METHOD

(71) Applicant: Sony Corporation, Tokyo (JP)

(72) Inventors: Akihisa Yamazaki, Kanagawa (JP); Tomoo Mitsunaga, Kanagawa (JP); Shun Kaizu, Tokyo (JP); Shin Yoshimura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 331 days.

(21) Appl. No.: 14/281,117

(22) Filed: May 19, 2014

(65) Prior Publication Data

US 2014/0347449 A1   Nov. 27, 2014

(30) Foreign Application Priority Data

May 24, 2013  (JP) ................................ 2013-109476

(51) Int. Cl.
*H04N 13/02* (2006.01)

(52) U.S. Cl.
CPC ....... *H04N 13/0257* (2013.01); *H04N 13/025* (2013.01); *H04N 13/0239* (2013.01)

(58) Field of Classification Search
CPC ............ H04N 13/0239; H04N 13/025; H04N 13/0257
USPC .......................................................... 348/47
See application file for complete search history.

(56) References Cited

U.S. PATENT DOCUMENTS

| | | | | |
|---|---|---|---|---|
| 5,453,611 A * | 9/1995 | Oozu | ................ | H01L 27/14621 250/208.1 |
| 5,745,171 A * | 4/1998 | Ogawa | .................. | H04N 9/045 348/234 |
| 5,852,753 A * | 12/1998 | Lo | .......................... | G03B 35/10 396/323 |
| 6,157,337 A * | 12/2000 | Sato | ........................ | G03B 35/10 341/155 |
| 7,676,146 B2 * | 3/2010 | Border | ................ | H04N 5/2258 348/22 |
| 7,944,481 B2 * | 5/2011 | Kim | .................... | H04N 13/0025 348/222.1 |
| 8,451,324 B2 * | 5/2013 | Park | .................... | G02B 27/2214 348/42 |

(Continued)

FOREIGN PATENT DOCUMENTS

JP    2011-176710    9/2011

*Primary Examiner* — Shan Elahi
(74) *Attorney, Agent, or Firm* — K&L Gates LLP (57) ABSTRACT

An imaging apparatus includes: a first imaging device including a first filter, and configured to output a first image signal, and the first filter preventing light in a predetermined wavelength band of wavelengths longer than visible light; a second imaging device arranged at a different position and configured to perform photoelectric conversion on subject light containing a wavelength component of the light in the predetermined wavelength band to output a second image signal; a correlation detection unit configured to detect a correlation between the first and second image signals; a luminance signal generation unit configured to generate a luminance signal; a color signal generation unit configured to generate a color signal; and a three-dimensional image generation unit configured to generate a three-dimensional image by the correlation, the luminance signal, and the color signal.

8 Claims, 4 Drawing Sheets

(56) References Cited

U.S. PATENT DOCUMENTS

| | | | | |
|---|---|---|---|---|
| 8,599,247 B2 * | 12/2013 | Morozov | | G02B 27/26 345/648 |
| 2002/0081029 A1 * | 6/2002 | Marugame | | G06T 5/50 382/190 |
| 2004/0202364 A1 * | 10/2004 | Otani | | G01B 21/042 382/154 |
| 2005/0264684 A1 * | 12/2005 | Kamon | | H04N 5/2351 348/362 |
| 2007/0035628 A1 * | 2/2007 | Kanai | | H04N 5/2259 348/159 |
| 2007/0146697 A1 * | 6/2007 | Noguchi | | B82Y 15/00 356/237.5 |
| 2007/0248356 A1 * | 10/2007 | Toji | | G03B 17/02 396/529 |
| 2008/0084484 A1 * | 4/2008 | Ochi | | G03B 13/02 348/222.1 |
| 2008/0278592 A1 * | 11/2008 | Kuno | | H04N 9/045 348/222.1 |
| 2009/0244288 A1 * | 10/2009 | Fujimoto | | H04N 5/2256 348/164 |
| 2010/0097444 A1 * | 4/2010 | Lablans | | G03B 35/00 348/46 |
| 2010/0134651 A1 * | 6/2010 | Morimoto | | H04N 5/2258 348/229.1 |
| 2010/0157091 A1 * | 6/2010 | Honda | | H01L 27/14645 348/223.1 |
| 2010/0321755 A1 * | 12/2010 | Cho | | G01S 7/4816 359/248 |
| 2011/0134293 A1 * | 6/2011 | Tanaka | | G02B 7/34 348/280 |
| 2011/0150446 A1 * | 6/2011 | Song | | G03B 13/32 396/90 |
| 2012/0056982 A1 * | 3/2012 | Katz | | H04N 13/025 348/43 |
| 2012/0169848 A1 * | 7/2012 | Bae | | G01S 7/4861 348/46 |
| 2012/0212584 A1 * | 8/2012 | Chen | | G03B 35/08 348/47 |
| 2012/0212619 A1 * | 8/2012 | Nagamune | | H04N 5/2256 348/164 |
| 2012/0268632 A1 * | 10/2012 | Kamon | | H04N 5/2351 348/294 |
| 2013/0147926 A1 * | 6/2013 | Hiramoto | | G03B 35/04 348/49 |
| 2013/0169759 A1 * | 7/2013 | Godavarty | | A61B 5/0073 348/47 |
| 2013/0250371 A1 * | 9/2013 | Verhaegh | | H04N 1/19 358/406 |
| 2014/0132791 A1 * | 5/2014 | Tzur | | H04N 5/23212 348/222.1 |

* cited by examiner

IMAGING APPARATUS AND IMAGING METHOD

CROSS REFERENCES TO RELATED APPLICATIONS

The present application claims priority to Japanese Priority Patent Application JP 2013-109476 filed in the Japan Patent Office on May 24, 2013, the entire content of which is hereby incorporated by reference.

BACKGROUND

The present disclosure relates to an imaging apparatus and an imaging method for capturing a three-dimensional image.

In recent years, an imaging apparatus that uses a stereo image captured from two different positions to calculate a position of a subject in a three-dimensional space and generate a three-dimensional image has been known. Such an imaging apparatus is used for three-dimensional object recognition in manufacturing facilities for industrial purposes or widely used as a system allowing stereoscopic viewing for broadcasting or domestic use.

In such an imaging apparatus, a color filter of R (red), G (green), and B (blue) is arranged in front of a light-receiving surface of an imaging device. The color filter allows light entering the light-receiving surface of the imaging device to be split into light of wavelength components of the respective colors R, G, and B, so that a color image using image signals of the decomposed R, G, and B is generated by the imaging apparatus.

However, the light entering the light-receiving surface of the imaging device through the lens is attenuated by passing through the color filter, and thus the amount of light entering the imaging device is also reduced by an amount corresponding to the attenuation. In other words, the sensitivity of the imaging device is reduced. Further, along with the achievement in high definition of images in recent years, the pixel size is reduced and the sensitivity is also reduced accordingly.

For that reason, in such an imaging apparatus that captures a color image, various techniques for improving the sensitivity of imaging are devised. For example, Japanese Patent Application Laid-open No. 2011-176710 discloses a technique in which a part of a color filter is replaced with a transparent filter to increase the amount of light taken in by an imaging device and improve the sensitivity.

SUMMARY

In the imaging apparatus that generates a color image, it is general to use an infrared cut filter (IRCF) together with the color filter. The IRCF is arranged in front of the imaging device, so that color reproducibility in a captured image can be improved. When the IRCF is arranged in front of the imaging device, however, the sensitivity of the imaging device is lowered.

It is desirable to achieve improvement in both of the sensitivity of the imaging device and the color reproducibility.

According to an embodiment of the present disclosure, there is provided an imaging apparatus including a first imaging device, a second imaging device, a correlation detection unit, a luminance signal generation unit, a color signal generation unit, and a three-dimensional image generation unit. The imaging apparatus has the following configurations and functions in the respective units. The first imaging device is configured to perform photoelectric conversion on subject light that is input through a first filter to output a first image signal, the first filter preventing light in a predetermined wavelength band of wavelengths longer than a wavelength of visible light from being transmitted. The second imaging device is arranged at a position different from a position of the first imaging device and configured to perform photoelectric conversion on subject light containing a wavelength component of the light in the predetermined wavelength band to output a second image signal. The correlation detection unit is configured to detect a correlation between the first image signal and the second image signal. The luminance signal generation unit is configured to generate a luminance signal from the second image signal. The color signal generation unit is configured to generate a color signal from at least one of the first image signal and the second image signal. The three-dimensional image generation unit is configured to generate a three-dimensional image by using information on the correlation between the first image signal and the second image signal, which is detected by the correlation detection unit, the luminance signal, and the color signal.

According to another embodiment of the present disclosure, there is provided an imaging method including: performing, by a first imaging device, photoelectric conversion on subject light that is input through a first filter to output a first image signal, the first filter preventing light in a predetermined wavelength band of wavelengths longer than a wavelength of visible light from being transmitted; performing, by a second imaging device arranged at a position different from a position of the first imaging device, photoelectric conversion on subject light containing a wavelength component of the light in the predetermined wavelength band to output a second image signal; detecting a correlation between the first image signal and the second image signal; generating a luminance signal from the second image signal; generating a color signal from at least one of the first image signal and the second image signal; and generating a three-dimensional image by using information on the detected correlation, the luminance signal, and the color signal.

The imaging apparatus is configured as described above to perform imaging, and thus a three-dimensional image is generated using the first image signal and the second image signal, the first image signal containing no wavelength component of the light in the predetermined wavelength band within a wavelength band of infrared rays, the second image signal containing also a wavelength component of the light in the predetermined wavelength band.

With the imaging apparatus and the imaging method according to the embodiments of the present disclosure, it is possible to achieve improvement in both of sensitivity of an imaging device and color reproducibility.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

An example of an imaging apparatus according to an embodiment of the present disclosure will be described with reference to the drawings.

1. Configuration Example of Imaging Apparatus

Figure 1:
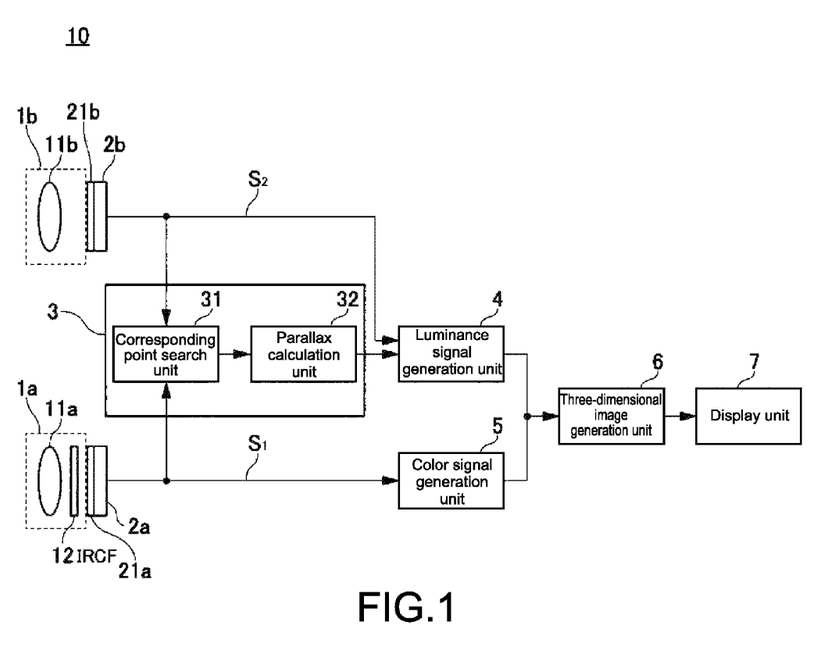
FIG. 1 is a block diagram showing a configuration of an imaging apparatus according to an embodiment of the present disclosure.

An imaging apparatus 10 according to this embodiment includes two imaging devices, that is, an imaging device 2a and an imaging device 2b as shown in FIG. 1. The imaging device 2a and the imaging device 2b are arranged at separate positions by a predetermined distance so as to capture images of a subject from different positions. The imaging device 2a on the lower side of FIG. 1 is provided with a first optical system 1a including a lens 11a and an infrared cut filter (IRCF) 12. The imaging device 2b on the upper side of FIG. 1 is provided with a second optical system 1b including a lens 11b. Further, the imaging device 2a and the imaging device 2b are provided with a color filter 21a and a color filter 21b, respectively. In the color filter 21a and the color filter 21b, pixels of R, G, and B are arrayed in a Bayer array, for example. Light containing each of an R, G, and B components, which has passed through the color filter 21a and the color filter 21b, enters pixels of the imaging device 2a and the imaging device 2b, respectively.

Each of the lens 11a and the lens 11b is constituted of one lens or a lens group including a plurality of lenses and takes in subject light into the imaging apparatus 10. The IRCF 12 is constituted as a first filter and blocks light having a wavelength longer than that of visible light in the light that has passed through the lens 11a, for example, infrared rays with a wavelength of 650 nm or longer. It should be noted that in the first optical system 1a and the second optical system 1b, a shift of a focal point due to the presence or absence of the IRCF 12 is caused. This shift can be eliminated by previously adjusting a back focus in the first optical system 1a and the second optical system 1b.

Each of the imaging device 2a and the imaging device 2b is constituted of an image sensor such as a CCD (Charge Coupled Device) or a CMOS (Complementary Metal Oxide Semiconductor). It is assumed that a color filter (not shown) is arranged in front of each of the imaging device 2a and the imaging device 2b.

The imaging device 2a performs photoelectric conversion on the subject light that has been input through the lens 11a, the IRCF 12, and the color filter 21a to generate an image signal (first image signal $S_1$). The imaging device 2b performs photoelectric conversion on the subject light that has been input through the lens 11b and the color filter 21b to generate an image signal (second image signal $S_2$).

Figure 2A:
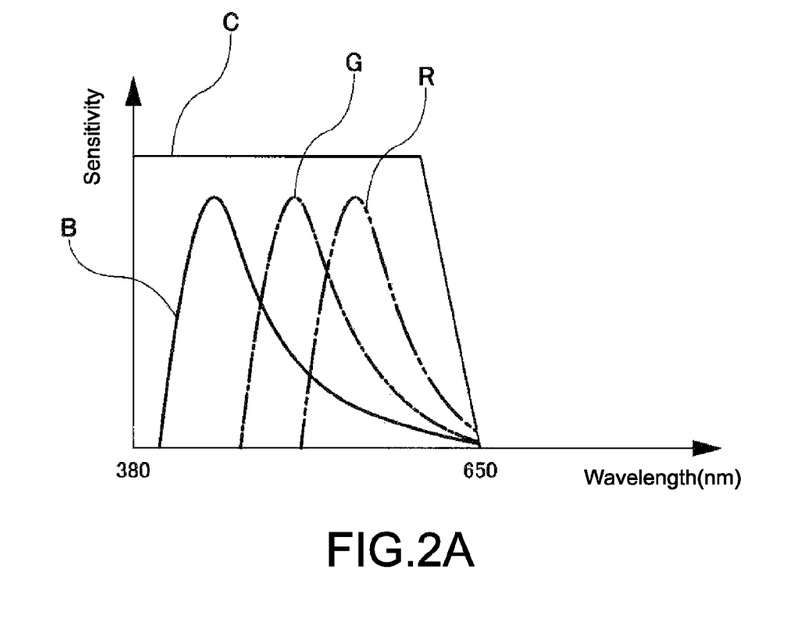
FIGS. 2A and 2B are graphs each showing spectral sensitivity characteristics of an imaging device according to the embodiment of the present disclosure, FIG. 2A showing the spectral sensitivity characteristics in a case where an infrared cut filter (IRCF) is arranged, FIG. 2B showing the spectral sensitivity characteristics in a case where no IRCF is arranged.
Figure 2B:
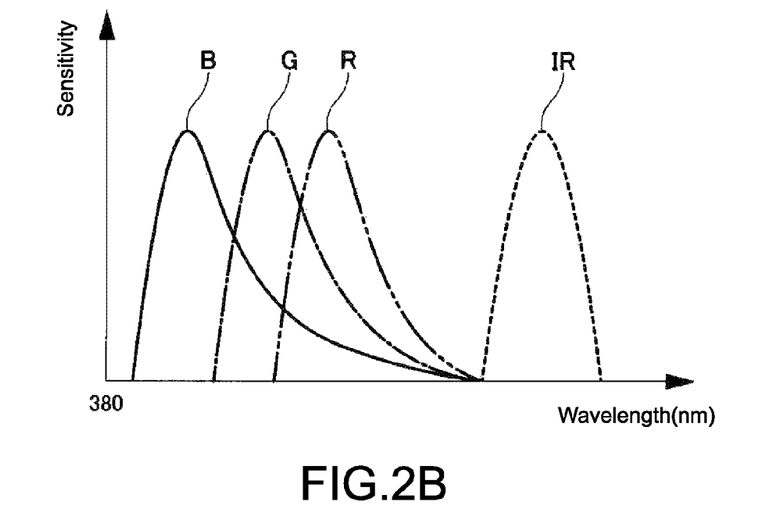

FIGS. 2A and 2B are graphs showing spectral sensitivity characteristics of the imaging device 2a and the imaging device 2b, respectively. FIG. 2A shows the spectral sensitivity characteristics of the imaging device 2a and FIG. 2B shows the spectral sensitivity characteristics of the imaging device 2b. In FIGS. 2A and 2B, the vertical axis represents the sensitivity of the imaging device, and the horizontal axis represents a wavelength (nm).

As described above, the light that has passed through the lens 11a and the IRCF 12 is input to the imaging device 2a. As shown in FIG. 2A, the IRCF 12 has filter characteristics C, by which the wavelength of 650 nm or more in the wavelength band of the infrared rays is blocked. So, only visible light containing wavelengths of B (blue) indicated by a solid line, G (green) indicated by a chain line, and R (red) indicated by a chain double-dashed line in FIG. 2A is input to the imaging device 2a. Consequently, the first image signal $S_1$ containing only a wavelength component of the visible light and containing no wavelength component of the infrared rays is output from the imaging device 2a. The first image signal $S_1$ is supplied to a correlation detection unit 3 and a color signal generation unit 5 that will be described later.

Meanwhile, the light that has passed through only the lens 11b is input to the imaging device 2b. So, not only the visible light containing R, G, and B but also infrared light IR in the wavelength band of infrared rays are input to the imaging device 2b. Consequently, the second image signal $S_2$ containing both wavelength components of the visible light and the infrared rays is output from the imaging device 2b. The second image signal $S_2$ is supplied to the correlation detection unit 3 and a luminance signal generation unit 4.

Referring back to FIG. 1, the imaging apparatus 10 further includes the correlation detection unit 3, the luminance signal generation unit 4, the color signal generation unit 5, a three-dimensional image generation unit 6, and a display unit 7. The correlation detection unit 3 detects a correlation between the first image signal $S_1$ and the second image signal $S_2$. The correlation detection unit 3 includes a corresponding point search unit 31 and a parallax calculation unit 32. Here, the case in which the imaging apparatus 10 includes the display unit 7 is exemplified, but the present disclosure is not limited to this case and may be applied to an imaging apparatus 10 that does not include the display unit 7.

The corresponding point search unit 31 performs processing of searching for a corresponding point, which corresponds to a specific observation point in an image formed of one of the first image signal $S_1$ and the second image signal $S_2$, from an image formed of the other image signal. In this embodiment, this corresponding point search processing is performed by using a normalized correlation method. The corresponding point search processing by the corresponding point search unit 31 using the normalized correlation method will be described later in detail with reference to FIGS. 3 and 4.

The parallax calculation unit 32 calculates a parallax between an image $P_1$ formed of the first image signal $S_1$ and an image $P_2$ formed of the second image signal $S_2$ based on information on the corresponding point detected by the corresponding point search unit 31. Further, based on information on the calculated parallax, the parallax calculation unit 32 also calculates a distance from the imaging apparatus 10 to the subject (depth in the depth direction). The parallax calculation unit 32 outputs information on the calculated distance to the subject to the luminance signal generation unit 4.

The luminance signal generation unit 4 generates a luminance signal from the second image signal $S_2$ containing the wavelength component of the infrared rays and supplies the generated luminance signal to the three-dimensional image generation unit 6. Thus, the luminance signal generated by the luminance signal generation unit 4 contains such a wavelength component that may be impossible to image under the environment of low illumination in the wavelength components of the subject.

The color signal generation unit 5 generates a color signal from the first image signal $S_1$ containing only the wavelength component of the visible light and supplies the generated color signal to the three-dimensional image generation unit 6. Thus, the color signal generated by the color signal generation unit 5 does not contain the wavelength component of the infrared rays. Consequently, the color reproducibility of a three-dimensional image to be generated by using such a color signal is improved.

The three-dimensional image generation unit 6 uses information on the distance to the subject, which is output from the parallax calculation unit 32, the luminance signal generated by the luminance signal generation unit 4, and the color signal generated by the color signal generation unit 5 to generate a three-dimensional image of the subject. The display unit 7 is constituted of an LCD (Liquid Crystal Display), an organic EL (Electro Luminescence) display, or the like and displays the three-dimensional image generated by the three-dimensional image generation unit 6.

2. Example of Corresponding Point Search Processing

Figure 3:
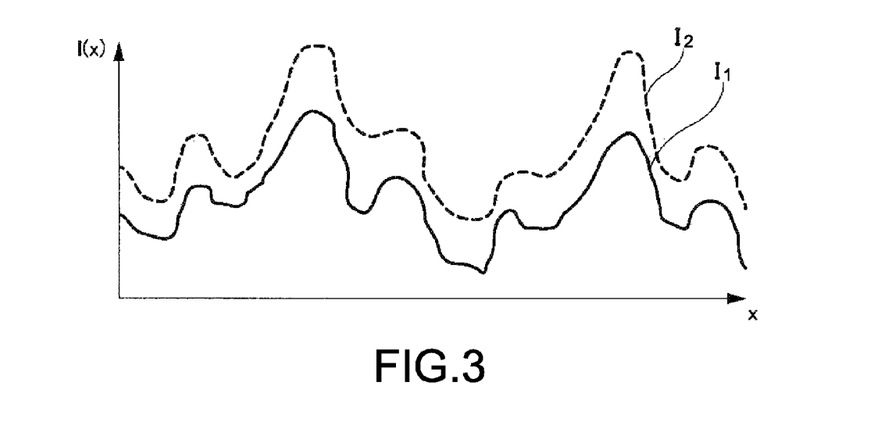
FIG. 3 is a graph showing a distribution of luminance values, in one-dimensional space, of pixel signals containing a wavelength component of infrared rays and pixel signals excluding the wavelength component of the infrared rays according to the embodiment of the present disclosure.
Figure 4:
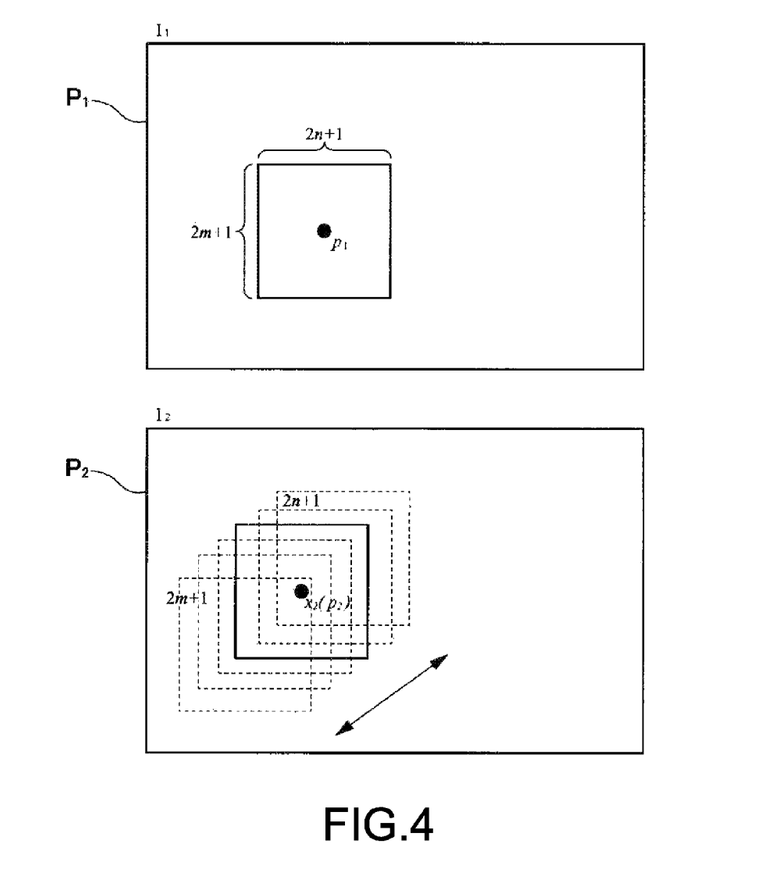
FIG. 4 is an explanatory diagram for describing a normalized correlation method.

Subsequently, an example of the corresponding point search processing by the corresponding point search unit 31 will be described with reference to FIGS. 3 and 4. FIG. 3 is a graph in which a luminance value $I_1$ of the first image signal $S_1$ containing only the wavelength component of the visible light and a luminance value $I_2$ of the second image signal $S_2$ containing the wavelength components of the visible light and the infrared rays are plotted on a coordinate of a one-dimensional space. Here, FIG. 3 shows an example in which those values are plotted on the x-coordinate. In FIG. 3, the vertical axis represents a luminance value $I(x)$ and the horizontal axis represents the x-coordinate. In FIG. 3, the luminance value $I_1$ of the first image signal $S_1$ containing only the wavelength component of the visible light is indicated by a solid line, and the luminance value $I_2$ of the second image signal $S_2$ containing the wavelength components of the visible light and the infrared rays is indicated by a broken line.

As shown in FIG. 3, the luminance value $I_1$ and the luminance value $I_2$ have substantially the same distribution form, and the distribution form of the luminance value $I_2$ containing the wavelength components of the visible light and the infrared rays is shifted to an upper side as a whole with respect to the distribution form of the luminance value $I_1$ containing no wavelength component of the infrared rays. In other words, both of the luminance values I have a shift in a direction of the luminance value but have a high mutual correlativity.

A corresponding point between such luminance value $I_1$ and luminance value $I_2$ can be searched for using the normalized correlation method. FIG. 4 is a diagram for describing the general outline of the normalized correlation method. In the normalized correlation method, a corresponding point $p_2$, which has the highest correlation with an observation point $p_1$ in the image $P_1$ shown on the upper side of FIG. 4, is searched for from the image $P_2$ shown on the lower side of FIG. 4.

More specifically, a correlation coefficient $\rho$, which indicates the degree of similarity between a local image around the observation point $p_1$ and a local image around the point $x_2$ as a candidate of the corresponding point $p_2$, is calculated each time the position of the point $x_2$ is moved. Subsequently, a point $x_2$ whose correlation coefficient $\rho$ is the highest is adopted as the corresponding point $p_2$. The size of the local image is assumed to be $(2n+1)$ by $(2m+1)$. The correlation coefficient $\rho$ of the observation point $p_1$ and the point $x_2$ (corresponding point $p_2$) can be calculated by the following expression.

$$\rho(p_1, p_2) = \frac{\sum_{i=-n}^{n}\sum_{j=-m}^{m}(I_1(u_1+i, v_1+j) - \mu_{p1})(I_2(u_2+i, v_2+j) - \mu_{p2})}{(2m+1)(2n+1)\sigma_{p1}\sigma_{p2}}$$

In the above expression, "$u_1$" and "$v_1$" represent the x-coordinate and the y-coordinate of the observation point $p_1$, and $I_1$ represents a luminance value of a pixel at coordinates $(u_1+i, v_1+j)$. Further, "$u_2$" and "$v_2$" represent the x-coordinate and the y-coordinate of the corresponding point $p_2$ (point $x_2$), and $I_2$ represents a luminance value of a pixel at coordinates $(u_2+i, v_2+j)$. In the above expression, "$\mu_{p1}$" represents an average value of the luminance value $I_1$ of the respective pixels in the local image around the observation point $p_1$. "$\mu_{p2}$" represents an average value of the luminance value $I_2$ of the respective pixels in the local image around the corresponding point $p_2$. "$\sigma_{p1}$" represents standard deviation of the luminance value $I_1$ of the respective pixels in the local image around the observation point $p_1$. "$\sigma_{p2}$" represents standard deviation of the luminance value $I_2$ of the respective pixels in the local image around the corresponding point $p_2$.

Using the normalized correlation method shown by the above expression, the corresponding point $p_2$ between the luminance value $I_2$ containing the wavelength component of the infrared rays and the luminance value $I_1$ containing no wavelength component of the infrared rays, the corresponding point $p_2$ having a shift in a luminance value level direction, can be searched for.

According to the embodiment described above, the luminance signal is generated from the image signal $S_2$ obtained by imaging of the imaging device 2b that does not include the IRCF 12. Specifically, a subject, which may be impossible to image under the environment of low illumination, can also be captured and taken in the imaging device 2b as a wavelength component of the infrared rays. Consequently, imaging with high sensitivity can be performed.

Further, when imaging is performed under the environment of low illumination, the image signal $S_2$ that is generated in the imaging device 2b having sensitivity also in the wavelength band of the infrared rays has a luminance value increased by an amount corresponding to the infrared light. With this, signal processing for raising the luminance value does not need to be performed, and thus S/N of the image signal $S_2$ is also improved. Further, the improvement in S/N of the image signal allows a noise removal filter to be applied less strongly. Consequently, a three-dimensional image with high definition and reduced noise can be obtained.

Further, according to the embodiment described above, the color signal is generated from the image signal $S_1$ containing no wavelength component of the infrared rays, and thus the color reproducibility of the generated three-dimensional image is kept satisfactorily. In other words, according to this embodiment, a three-dimensional image having high sensitivity and high color reproducibility is provided.

Specifically, according to this embodiment, it is not necessary to additionally provide a light projection apparatus such as an infrared LED (Light Emitting Diode) to the outside and change the configuration of a three-dimensional compound-eye camera. Change in only the configuration of the imaging device 2b (and imaging device 2a) and the content of the signal processing allows a three-dimensional image with high sensitivity and high color reproducibility to be obtained.

Further, according to the embodiment described above, since the IRCF 12 is not arranged in front of the imaging device 2b, the imaging device 2b has sensitivity to the wavelength component of the infrared rays. Consequently, the subject can be imaged also under the environment of low illumination.

At that time, an infrared-ray projection apparatus such as an infrared LED is used to apply fill light to the subject at the time of imaging. Thus, a three-dimensional image can be captured also under the environment of extremely low illumination. As the infrared-ray projection apparatus, apparatuses that apply the wavelengths of about 850 nm and about 950 nm are used relatively frequently, and such an infrared-ray projection apparatus can be used, for example.

3. Various Modified Examples

It should be noted that in the embodiment described above, the cutoff frequency of the IRCF 12 is set to 650 nm but is not limited to this frequency, and other frequencies may be applied in accordance with the spectral sensitivity characteristics of the imaging device 2b and an imaging environment.

Further, in the embodiment described above, the IRCF 12 is not provided in front of the imaging device 2b, and thus the imaging device 2b is provided with the spectral sensitivity characteristics to have the sensitivity also to the frequency band of the infrared rays. However, the present disclosure is not limited to this and an IRCF (second filter) that causes both of the visible light and the light in the predetermined band of the infrared rays to pass therethrough may be provided in front of the imaging device 2b.

Figure 5:
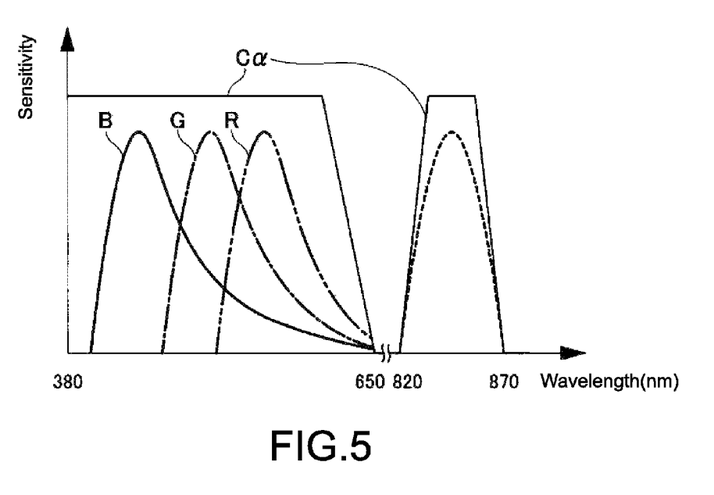
FIG. 5 is a graph showing spectral sensitivity characteristics of an imaging device according to a modified example of the present disclosure.

FIG. 5 is a graph showing filter characteristics Ca of an IRCF 12a serving as a second filter and spectral sensitivity characteristics of the imaging device 2b. As shown in FIG. 5, the IRCF 12a has the filter characteristics Ca, by which the light in the wavelength band of 650 nm or less and in the wavelength band of infrared rays from 820 nm to 870 nm are caused to pass therethrough. Visible light in the wavelength band of 650 nm or less and infrared rays in the wavelength band from 820 nm to 870 nm are input to the imaging device 2b provided with the IRCF 12a. In other words, light in the wavelength band of near-infrared rays from 650 nm to 820 nm is not input to the imaging device 2b.

As shown in FIG. 5, the wavelength band from 650 nm to 820 nm is a wavelength band having sensitivity to all light of R, G, and B but having low sensitivity thereto. Blocking of the light in this wavelength band allows improvement in color reproducibility of the image signal $S_2$ generated in the imaging device 2b. Further, if the wavelength band of light that passes through the IRCF 12a is set assuming that fill light of an infrared LED is applied, the fill light by the infrared LED can be used effectively. Specifically, the filter characteristics Ca of the IRCF 12a can be set to appropriate characteristics in accordance with the spectral sensitivity characteristics of the imaging device 2b or an emission spectrum of the infrared LED to be used.

Figure 6:
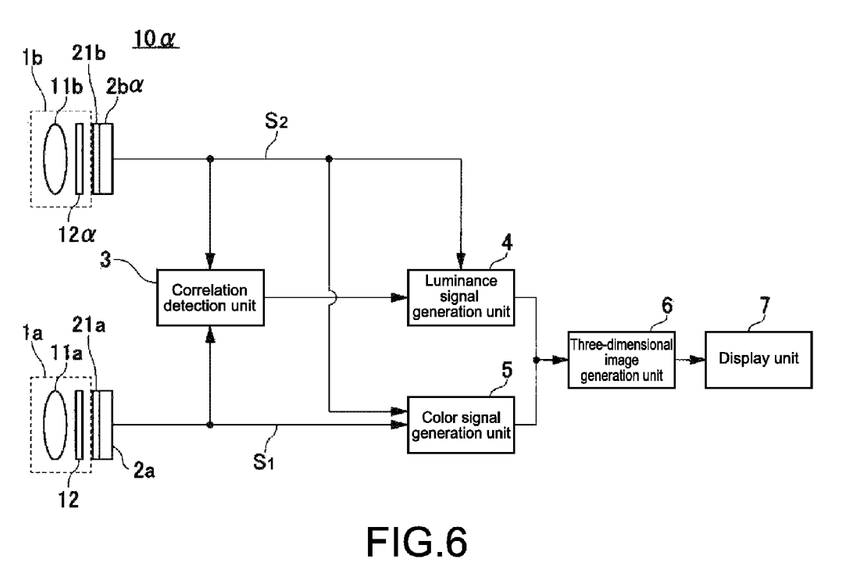
FIG. 6 is a block diagram showing a configuration of an imaging apparatus according to the modified example of the present disclosure.

FIG. 6 is a block diagram showing a configuration example of an imaging apparatus 10a in which the IRCF 12a is used. In FIG. 6, parts corresponding to those of FIG. 1 are denoted by the same reference symbols and overlapping description will be omitted. In the configuration shown in FIG. 6, an image signal $S_2$ generated in an imaging device 2ba that is provided with the IRCF 12a is also input to a color signal generation unit 4. Specifically, a color signal is generated from the image signal $S_2$, from which light in a wavelength band having sensitivity to all of the light R, G, and B in the spectral sensitivity characteristics of the imaging device 2ba but having low sensitivity thereto is cut. Thus, the color reproducibility is improved.

Further, when the IRCF 12a is provided also in front of the imaging device 2ba, the spectral sensitivity characteristics of the imaging device 2a and those of the imaging device 2ba are made more similar to each other than those in the configuration shown in FIG. 1. Thus, the color reproducibility can be more improved.

Furthermore, in the correlation detection unit 3, subtractive color signal correction processing (color matrix processing) to cancel a component of the infrared rays may further be performed on the image signal $S_2$. The execution of this processing allows the color reproducibility of R, G, and B in the image $P_1$ formed of the image signal $S_1$ and in the image $P_2$ formed of the image signal $S_2$ to be made more similar to each other, thus further improving the color reproducibility.

It should be noted that the present disclosure can have the following configurations.

(1) An imaging apparatus, including:
  a first imaging device configured to perform photoelectric conversion on subject light that is input through a first filter to output a first image signal, the first filter preventing light in a predetermined wavelength band of wavelengths longer than a wavelength of visible light from being transmitted;
  a second imaging device that is arranged at a position different from a position of the first imaging device and configured to perform photoelectric conversion on subject light containing a wavelength component of the light in the predetermined wavelength band to output a second image signal;
  a correlation detection unit configured to detect a correlation between the first image signal and the second image signal;
  a luminance signal generation unit configured to generate a luminance signal from the second image signal;
  a color signal generation unit configured to generate a color signal from at least one of the first image signal and the second image signal; and
  a three-dimensional image generation unit configured to generate a three-dimensional image by using information on the correlation detected by the correlation detection unit, the luminance signal, and the color signal.

(2) The imaging apparatus according to (1), in which
  the first imaging device is configured to perform the photoelectric conversion on the subject light that is input through the first filter and does not contain light in a wavelength band of infrared rays to generate the first image signal.
(3) The imaging apparatus according to (1) or (2), in which the correlation detection unit is configured to detect the correlation between the first image signal and the second image signal by using a normalized correlation method.
(4) The imaging apparatus according to any one of (1) to (3), in which
the first imaging device is configured to generate the first image signal from the subject light that is input through an infrared cut filter as the first filter.
(5) The imaging apparatus according to any one of (1) to (4), in which
the second imaging device is configured to generate the second image signal from subject light that is input through a second filter, the second filter blocking light in a predetermined wavelength band within a wavelength band of near-infrared rays.
(6) The imaging apparatus according to (5), in which
the second imaging device is configured to generate the second image signal from the subject light that is input through the second filter and excludes light in a wavelength band having sensitivity to all of light R, G, and B in spectral sensitivity characteristics of the second imaging device but having low sensitivity thereto.
(7) An imaging method, including:
performing, by a first imaging device, photoelectric conversion on subject light that is input through a first filter to output a first image signal, the first filter preventing light in a predetermined wavelength band of wavelengths longer than a wavelength of visible light from being transmitted;
performing, by a second imaging device arranged at a position different from a position of the first imaging device, photoelectric conversion on subject light containing a wavelength component of the light in the predetermined wavelength band to output a second image signal;
detecting a correlation between the first image signal and the second image signal;
generating a luminance signal from the second image signal;
generating a color signal from at least one of the first image signal and the second image signal; and
generating a three-dimensional image by using information on the detected correlation, the luminance signal, and the color signal.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. An imaging apparatus, comprising:
a first imaging device including a first filter, the first imaging device configured to perform photoelectric conversion on subject light that is input through the first filter to output a first image signal, the first filter preventing light in a predetermined wavelength band of wavelengths longer than a wavelength of visible light from being transmitted;
a second imaging device that is arranged at a position different from a position of the first imaging device and the second imaging device is configured to perform photoelectric conversion on subject light containing a wavelength component of the light in the predetermined wavelength band to output a second image signal;
a correlation detection device configured to generate correlation information from the first image signal and the second image signal;
a luminance signal generation device configured to generate a luminance signal from the second image signal;
a color signal generation device configured to generate a color signal from at least one of the first image signal and the second image signal; and
a three-dimensional image generation device configured to generate a three-dimensional image based on the correlation information, the luminance signal, and the color signal, and to transmit the generated three-dimensional image to a display device,
wherein the first filter is configured to prevent transmission of light in a wavelength band of infrared rays, and
wherein the correlation detection device is configured to generate the correlation information between the first image signal and the second image signal by using a normalized correlation method.
2. The imaging apparatus according to claim 1, wherein the first filter includes an infrared cut filter.
3. The imaging apparatus according to claim 2, wherein the second imaging device includes a second filter, the second imaging device configured to generate the second image signal from subject light that is input through the second filter, the second filter blocking light in a wavelength band of near-infrared rays.
4. The imaging apparatus according to claim 3, wherein the second imaging device is configured to perform photoelectric conversion on the subject light that is input through the second filter, and is configured to exclude light in a wavelength band in which bottoms of wavelengths of R, G, and B on a high frequency side overlap with one another, to generate the second image signal.
5. An imaging method, comprising:
performing, by a first imaging device including a first filter, photoelectric conversion on subject light that is input through the first filter to output a first image signal, the first filter preventing light in a predetermined wavelength band of wavelengths longer than a wavelength of visible light from being transmitted;
performing, by a second imaging device arranged at a position different from a position of the first imaging device, photoelectric conversion on subject light containing a wavelength component of the light in the predetermined wavelength band to output a second image signal;
generating correlation information, by a correlation detection device, from the first image signal and the second image signal;
generating a luminance signal from the second image signal;
generating a color signal from at least one of the first image signal and the second image signal;
generating a three-dimensional image based on the correlation information, the luminance signal, and the color signal; and
transmitting the generated three-dimensional image to a display device, wherein the first filter is configured to prevent transmission of light in a wavelength band of infrared rays, and wherein the correlation detection device is configured to generate the correlation information between the first image signal and the second image signal by using a normalized correlation method.

6. The imaging method according to claim 5, wherein the first filter includes an infrared cut filter.

7. The imaging method according to claim 6, wherein the second imaging device includes a second filter, and the second imaging device is configured to generate the second image signal from subject light that is input through the second filter, the second filter blocking light in a wavelength band of near-infrared rays.

8. The imaging method according to claim 7, wherein the second imaging device is configured to perform photoelectric conversion on the subject light that is input through the second filter, and is configured to exclude light in a wavelength band in which bottoms of wavelengths of R, G, and B on a high frequency side overlap with one another, to generate the second image signal.

* * * * *